United States Patent [19]

Guimbretiere

[11] Patent Number: 4,465,326
[45] Date of Patent: Aug. 14, 1984

[54] APPARATUS FOR MOUNTING A WHEEL, PARTICULARLY A STEERING AND DRIVING WHEEL FOR AN AUTOMOBILE

[75] Inventor: Pierre L. Guimbretiere, Neauphle le Chateau, France

[73] Assignee: Glaenzer Spicer, Poissy, France

[21] Appl. No.: 432,104

[22] Filed: Sep. 29, 1982

[30] Foreign Application Priority Data

Oct. 23, 1981 [FR] France ............................ 81 19925

[51] Int. Cl.³ ...................... F16C 33/58; F16C 43/04
[52] U.S. Cl. ..................................... 308/191; 308/236
[58] Field of Search ............... 308/190, 191, 196, 236, 308/DIG. 11

[56] References Cited

U.S. PATENT DOCUMENTS

| | | | |
|---|---|---|---|
| 1,796,610 | 3/1931 | Modler | 308/236 |
| 2,711,936 | 6/1955 | Rhine | 308/211 X |
| 3,583,511 | 6/1971 | Asberg | 308/191 X |
| 4,026,610 | 5/1977 | Neder et al. | 308/236 |
| 4,047,770 | 9/1977 | Korenhof et al. | 308/191 |
| 4,352,528 | 10/1982 | Guimbretiere | 308/236 X |

*Primary Examiner*—Stuart S. Levy
*Assistant Examiner*—Thomas R. Hannon
*Attorney, Agent, or Firm*—Wenderoth, Lind & Ponack

[57] ABSTRACT

An arrangement for mounting an automobile wheel, particularly a driving and steering wheel for a front wheel drive automobile including a wheel disk, a bearing arrangement having two inner bearing tracks, wherein one of the bearing tracks is an element integral with the wheel disk, there being included a tubular centering means over which the wheel disk-bearing track integral element, as well as the other inner bearing track, fit, the other bearing track and the centering means being different, that is, non-integral, units.

2 Claims, 2 Drawing Figures

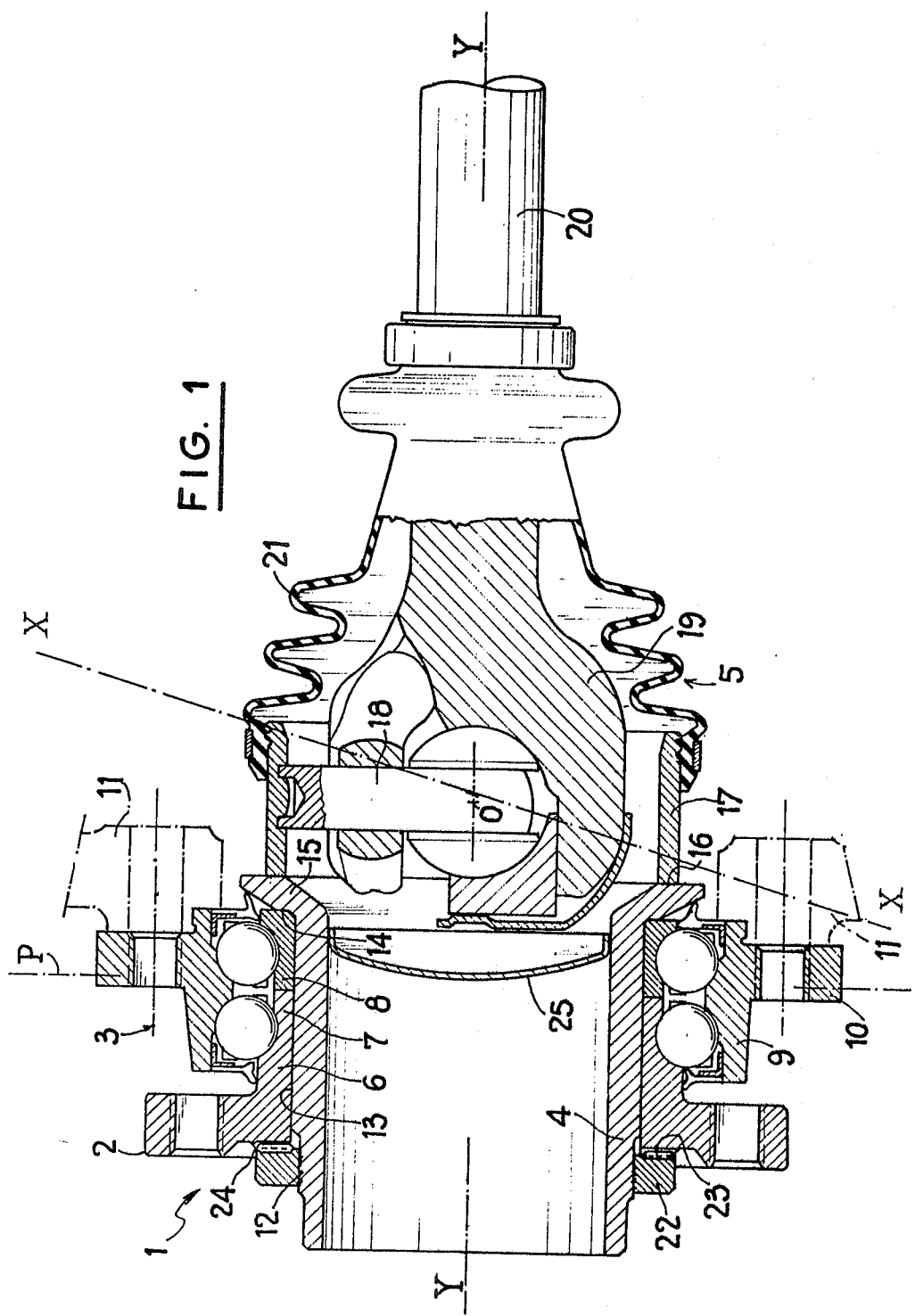

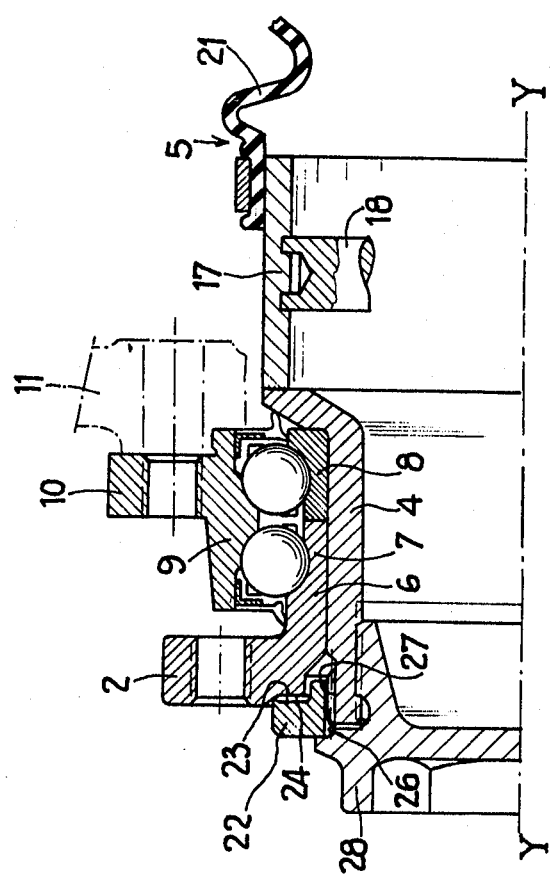

APPARATUS FOR MOUNTING A WHEEL, PARTICULARLY A STEERING AND DRIVING WHEEL FOR AN AUTOMOBILE

DESCRIPTION

This invention relates to an apparatus for mounting a wheel, particularly a steering and driving wheel of an automobile, of the type including a wheel disk and a bearing arrangement having a double row of rolling elements which includes two interior ring elements and, an exterior ring element connected to the vehicle suspension and in particular to the wheel pivot.

For sometime, a primary goal in the automobile industry has been the search for minimum weight, minimum cost, together with the greatest range of movement for suspended wheels, particularly steering and driving wheels.

For such wheels, in general, the center of the universal joint of the transmission adjacent the wheel is located approximately on the line of articulation of the pivot of the wheel. Materially, the pivoting, or the steering, of the wheel is therefore limited by the construction of the pivot itself, by the contact of the wheel with the chassis, or by the range of the universal joint.

Consequently, in order to improve the steering of a forward driving wheel of which the wheel pivot has a given construction, one can, firstly, attempt to increase the angular range of the universal joint. This possibility rapidly encounters difficulties, such as the substantial reduction of the torque-transmitting of the joint, the increase in the angular stress on the seal of the universal joint, etc.

Another possibility consists of displacing as much as possible the center of the universal joint toward the wheel as this reduces the angle of the joint for each angular position of the wheel for any given universal joint.

In order to be able to displace the center of the universal joint toward the wheel, is necessary to modify the construction of the bearings or their dimensions. There have been envisaged what the specialists call third and fourth generation bearings which have in common the feature of utilising a single interior ring for the two rows of balls. One thus reduces the thickness of the necessary material at the interior of the bearing which frees space for the placement of a part of the universal joint which generally has a shape which converges toward the wheel. However, with such an arrangement, one cannot achieve the maximum number of balls, which considerably reduces the load capacity and/or the useful life of the bearings; in addition, other problems are posed, particularly problems in regard to sealing.

One can also consider appreciably increasing the diameter of the bearing rings, conserving the classic construction of the two separate interior rings. However, this arrangement is far from optimum in regard to cost of construction, as well as the weight of the mounting arrangement.

This invention has for an object to provide an apparatus for mounting a wheel which allows, for a given diameter of the bearing, a decrease in the cost and the weight of the apparatus as well as an increase in the available space inside the bearing.

The invention therefore provides an apparatus for mounting a wheel of this type in which the interior ring of the bearing adjacent the wheel disk and the wheel disk are made in a single piece or unit, this single piece and the other interior ring remote from the wheel disk being supported by a tubular centering element distinct from the interior ring remote from the wheel disk.

This separate construction of the centering element for the rings and of the interior ring remote from the wheel disk is simpler than the manufacture as one single element. This arrangement allows one to separate the respective functions of the two elements, and to make each of them from the most appropriate material, which, in addition, simplifies their manufacture. Indeed, the interior ring should be made from an appropriate "noble" material, which is therefore expensive, while the centering element can be made from an ordinary metal or alloy, which is less expensive.

Preferably, the element which forms the wheel disk and interior ring is rigidly affixed, laterally and rotationally, to the tubular element by means of a connecting collar. This collar assures an excellent connection between the wheel disk and its adjacent ring to the tubular centering element.

The invention is described in more detail hereafter in connection with the annexed drawings, which represent two non limiting embodiments. In the drawings:

FIG. 1 is a longitudinal cross sectional view of a mounting apparatus according to the invention for mounting a steering and driving wheel;

FIG. 2 shows a variation of the apparatus of FIG. 1, the universal joint of the transmission having been, to a great extent, omitted.

The mounting apparatus 1 seen in FIG. 1 is adapted for mounting a steering and driving wheel (not depicted) to a front wheel drive automobile, the wheel being affixed on a wheel disk 2. The apparatus 1 includes a bearing 3 having two rows of rolling elements or balls which have oblique contact and a central tubular element 4 to which is connected a universal transmission joint 5 having an axially supported tripod.

The wheel disk 2 is provided, at its interior periphery, with a tubular extension 6 which extends from the wheel and forms the interior ring 7 of the bearing 3. The other interior ring 8 of this bearing is a separate element and has the same interior diameter. The bearing includes an exterior ring 9 formed of a single element having two bearing tracks facing axially outward from this ring and including a flange 10 adapted for mounting on the pivot of the wheel 11, which pivot is shown in dot-dash lines and connected to the suspension of the vehicle (not depicted).

The axis X—X of the pivot 11 passes approximately through the center 0 of the joint 5 which is fixed with respect to the wheel disk 2 and is located on the common axis Y—Y of the wheel disk and the bearing 3.

The tubular element 4 has an elevated portion 12, a portion 13 which contacts the smooth interior surfaces of the wheel disk 2, its extension 6, and of the ring 8, a radial shoulder 14 against which abuts the ring 8, and an end flared portion 15. The edge 16, which is flat and radially extending, of the portion 15 is welded the edge of a sleeve 17 which constitutes a bowl of the joint 5; on the interior wall of this sleeve are affixed the extremities of the three arms 18 of the tripod, while the element 19 of the joint 5 is rigidly connected with the transverse shaft 20. A protecting cover 21 connects in a sealed manner the free end portion of the sleeve 17 to a ring of the shaft 20.

To assemble the apparatus 1, one forces ring 8 onto the element 4 until it abuts shoulder 14; one arranges the first row balls with its cage and seal means; one places in position the exterior ring 9; one arranges the second row of balls with its cage and seal means; one forces the wheel disk 2 over the element 4 until its extension 6 abuts ring 8; and one places the fixing collar 22 over the portion 12 of the element 4.

The collar 22 has, on one face, radial grooves 23 which engage corresponding grooves 24 provided in the external face of wheel disk 2. This collar is pushed against the wheel disk until the desired pressure on the rings 7 and 8 is obtained, and the position of the collar is fixed by welding, for example, by a welding process of electronic bombardment. A light cap 25 arranged in element 4 completes the sealing protection of the joint 5.

It is seen that only two thicknesses of metal are necessary for bearing 3: that of the ring 7 or 8 and that of the tubular element 4. Consequently, for a given diameter of the bearing 3, substantial space becomes available inside this bearing, which permits the arrangement of the center 0 of the joint 5 closer to the plane of support P of the wheel than in conventional arrangements, simultaneously saving weight and cost and assuring a centering of the wheel disk 2 and of the bearing 3.

An important advantage of the construction in two distinct pieces of the interior ring 8 and the tubular centering element 4 resides in the simplification and reduced cost of this fabrication compared with a single unit construction of these elements. Indeed, one can thus better adopt each element to its respective function and form them of a material appropriate for each function, as explained above.

It should also be noted that the mounting apparatus of the invention is compatible with any type of transmission joint. If the torque to be transmitted is sufficiently low, one could even envisage locating the joint entirely in the element 4, which would then additionally play the role of the sleeve 17.

The embodiment of FIG. 2 does not differ from the above except in the manner of mounting the collar 22. In this embodiment, the collar has an L shaped cross section and also has interior axial grooves 26 which cooperate with corresponding grooves 27 located in the raised portion of the element 4. The collar 22 is axially engaged by the blind nut 28 which is threaded on the end portion of element 4 until the obtainment of the desired prestress on bearing 3. The nut 28 creates a sealed joint with element 4 so that the cap 25 can be eliminated. This embodiment, which is somewhat heavier than that of FIG. 1, has the advantage of being easier to manufacture in large quantities and also it can be dismantled rapidly, particularly when, as seen in FIG. 2, the maximum exterior diameter of the joint 5 does not permit it to traverse wheel pivot 11. However, the embodiment of the welded collar of FIG. 1 can also be easily dismantled by a specialist.

In the two embodiments, the collar rigidly connecting, as to lateral and rotational movement, the centering element 4 and the wheel disk 2 in one piece with the interior ring 7, permits the transmission of driving torque.

In the embodiment above described, the sleeve 17 may be constructed of the same material as the tubular element 4. In addition, in absence of the joint 5, the mounting apparatus can be used for mounting any wheel of the vehicle, with the above described advantages, with the exception obviously of those regarding the possibility of having the joint nearer to the wheel.

Having now described my invention what I claim as new and desire to secure by Letters Patent is:

1. Apparatus for mounting a wheel, in particular a steering and driving wheel of a motor car having a suspension, the apparatus comprising a wheel-carrying disk and a rolling bearing means comprising a double row of rolling elements, two interior rings and an exterior ring which is for connection to the suspension, one of the interior rings being adjacent to the wheel-carrying disk and in one piece with said wheel-carrying disk, so as to constitute a single element, said single element and the other of the interior rings being carried by a centering tubular member which latter is distinct from said other interior ring, said single element being rigidly fixed to the tubular member against rotation and movement in translation by a collar which includes frontal grooves corresponding with and engaging frontal grooves on an outside face of the wheel-carrying disk and is welded to the tubular member.

2. Apparatus for mounting a wheel, in particular a steering and driving wheel of a motor car having a suspension, the apparatus comprising a wheel-carrying disk and a rolling bearing means comprising a double row of rolling elements, two interior rings and an exterior ring which is for connection to the suspension, one of the interior rings being adjacent to the wheel-carrying disk and in one piece with said wheel-carrying disk, so as to constitute a single element, said single element and the other of the interior rings being carried by a centering tubular member which latter is distinct from said other interior ring, said single element being rigidly fixed to the tubular member against rotation and movement in translation by a collar which includes frontal grooves corresponding with and engaging frontal grooves on an outer face of the wheel-carrying disk, and includes axial interior grooves corresponding with and engaging grooves on the tubular member, a threaded element being screwthreadedly engaged on the tubular member and urging the collar against the wheel-carrying disk.

* * * * *